United States Patent [19]

Morrison

[11] Patent Number: 5,782,590

[45] Date of Patent: Jul. 21, 1998

[54] APPARATUS FOR CONTOUR SHAPING AND FINISH BEVELING EDGES OF EYEWEAR LENSES

[75] Inventor: James W. Morrison, Sarasota, Fla.

[73] Assignee: Morrison International Inc., Sarasota, Fla.

[21] Appl. No.: 639,870

[22] Filed: Apr. 26, 1996

[51] Int. Cl.[6] .................................. B23C 1/20; B23C 3/12
[52] U.S. Cl. .................. 409/124; 409/138; 409/229; 409/178; 451/460
[58] Field of Search ........................ 409/130, 123, 409/110, 111, 112, 125, 228, 229, 138, 137, 124, 182, 178, 179; 83/171; 451/43, 44, 358, 545, 558, 460, 240, 255, 256

[56] References Cited

U.S. PATENT DOCUMENTS

| 1,520,445 | 12/1924 | Rushmer | 451/460 X |
|---|---|---|---|
| 2,166,037 | 7/1939 | Campos | 451/460 X |
| 2,255,541 | 9/1941 | Dremel . | |
| 2,624,242 | 1/1953 | Eberle et al. | 409/110 |
| 2,930,290 | 3/1960 | Cooke | 409/178 |
| 4,000,395 | 12/1976 | Fischer | 83/171 X |
| 4,541,760 | 9/1985 | Zoueki | 409/137 |
| 4,787,786 | 11/1988 | Freud et al. | 409/178 X |
| 4,946,323 | 8/1990 | Kazama et al. | 409/178 |
| 5,018,914 | 5/1991 | Kishi | 409/178 |
| 5,158,422 | 10/1992 | Wagner . | |

FOREIGN PATENT DOCUMENTS 2068797  8/1981  United Kingdom ............... 451/43

Primary Examiner—A. L. Pitts
Assistant Examiner—Henry W. H. Tsai
Attorney, Agent, or Firm—M. Lukacher; K. Lukacher

[57] ABSTRACT

A portable, rotary power tool includes a guide roller and a special designed cutter mounted to the spindle of the tool. The rotary tool is presented to a lens blank mounted to a lens defining pattern. The guide roller engages and follows the shape defining lens pattern while the special designed cutter contacts and removes material from the lens blank being contoured. The cutter may be square and include a further shape defining cutting surface thereon for providing a bevel to the lens edge. In a further embodiment, a rotary power tool similar to the above device, including the guide roller and cutter, is mounted to a support fixture. The fixture includes a pivoting arm assembly to which a lens blank and lens defining pattern are mounted. The pivot arm assembly is rotatable toward and away from the cutter carried by the rotary tool such that the cutter engages and removes material from the lens blank dependant upon the shape defined by the lens pattern. The pivot arm includes apparatus for rotating the lens blank about an axis while being contoured. The fixture may include a heating/cutting device for initial bulk shaping of the lens blank being contoured.

26 Claims, 6 Drawing Sheets

APPARATUS FOR CONTOUR SHAPING AND FINISH BEVELING EDGES OF EYEWEAR LENSES

BACKGROUND AND SUMMARY OF THE INVENTION

The present invention relates to apparatus for contouring the edges of eyewear lenses, and more particularly, apparatus constructed economically from readily available parts for custom shaping such lenses, which apparatus may be easily transported from job site to job site.

Typically, in the past, the task of contouring the edges of eyewear lenses was performed by job specific machinery, either in a factory setting or in an ophthalmic laboratory. Such equipments, by their very nature, are quite expensive to manufacture and very sophisticated in construction. These costs are, of course, passed on to the end user, which is the patient. In many instances, the patient cannot afford even basic needs and, therefore, cannot afford to purchase expensive corrective eyewear. Further, many of the lens edge contouring devices are dedicated solely to grinding an edge profile on glass lenses and, accordingly were inappropriate for producing an edge profile on plastic lenses which are quite popular because of their light weight, as well as modest cost. An example of one such piece of equipment is illustrated in U.S. Pat. No. 5,158,422 issued Oct. 27, 1992 to Mark D. Wagner which requires a sophisticated mechanism with banks of pneumatic controls and electronic sensing devices. The attendant cost limits such edgers to manufacturers or shops which use them for mass production of quantities of finished lenses. As a significant portion of the cost of producing eyewear lenses is controlled by the expense of procuring and operating job dedicated equipments, and by the associated expenditures of factories or laboratories dedicated to producing eyewear lenses, it is evident that a more effective means of cost control is needed.

Therefore, it is a principal object of the invention to provide an improved lens edging device which is readily transportable from one location to another.

It is a further object of the invention to provide an improved lens edging device which may be hand held and is operative for quickly and accurately contouring the edges of plastic eyewear lenses.

It is a still further object of the invention to provide an improved device for contouring the edges of plastic eyewear lenses, which device includes an economical, easy to produce cutting means for shaping the lens edge.

It is a further object of the invention to provide an improved lens edging apparatus which is of low cost, and is simple to manufacture and readily transportable, which is operative for contouring the edges of plastic eyewear lenses and which device can be supported on a housing, the housing having devices mounted thereto for holding such plastic lenses and accurately introducing same to the edge contouring device for shaping thereof.

A feature of the invention is to avoid the extra step of blocking the lens to align it to axis and affixing a chuck to the lens to hold it in place during conventional edging. Blocking necessitates a separate piece of equipment, extra counter space and additional costs of consumables.

Another feature of the invention is that the overall dimensions need approximately ⅓ the width and depth, and therefore the counter space needed for a conventional lens edger.

Briefly described, as embodied in apparatus wherein the edges of plastic lenses are shaped to fit specific lens shapes of eyewear frames, the invention in its simplest form comprises a hand-held rotary tool having a square-shaped cutter mounted thereto. The edges of the square-shaped cutter provide a shaped surface, such as a V-shaped bevel, to a plastic lens to be edged. A guide roller is coaxially mounted with the square-shaped cutter to the rotary tool. An appropriate lens pattern which mimics and, therefore, defines the shape of the lens to be contoured and edged is received to an unfinished plastic lens blank. The joined pattern and lens blank are introduced by hand to the rotary power tool with the pattern being positioned against the guide roller. By simply guiding and rotating the combined pattern and lens blank against the guide roller, the cutter skives away the edges of the lens blank until a specific and desired lens periphery with V-shape bevel is derived.

A more sophisticated, yet still exceedingly simple, apparatus for shaping the edges of plastic lenses is further provided by the invention and includes a mounting fixture to hold a rotary tool and, a square-shaped, V-notched cutter mounted thereto, in alignment with the edge of a plastic lens. The lens is held by a clamping device which is pivotally mounted to the fixture so as to be moveable toward and away from the rotary tool. The lens blank to be shaped and a pattern for engaging the lens blank and defining the shape of the lens edge upon introducing the lens blank to the square-shaped cutter are mounted to the pivoting device. The pivoting device may include apparatus to quickly clamp the unfinished lens blank thereto so as to readily align with the square-shaped cutter mounted to the rotary tool and to a guide roller also mounted thereto. The pivoting device further includes a gauging device for registering unfinished lens blanks according to the interpupillary distance (IPD) required by the patient for which the lens is being edged. The fixture may also include an additional heat cutting device for quickly removing large portions of the lens blank in preparation for final shaping of the lens.

BRIEF DESCRIPTION OF THE DRAWINGS

The foregoing and other objects features and advantages of the invention will be come apparent from reading the following description in connection with the accompanying drawings in which.

DESCRIPTION OF THE PREFERRED EMBODIMENTS

Figure 1:
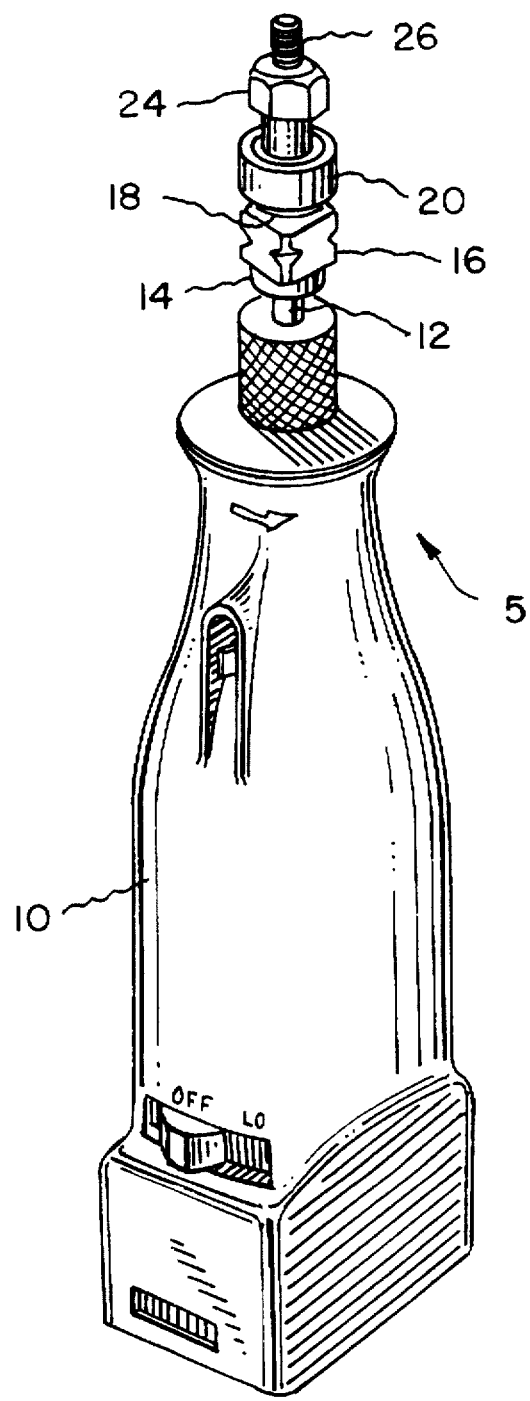
FIG. 1 is a perspective view of a hand-held rotary lens edger, according to the invention, having a square-shaped cutter for defining the edge of a plastic lens.
Figure 2:
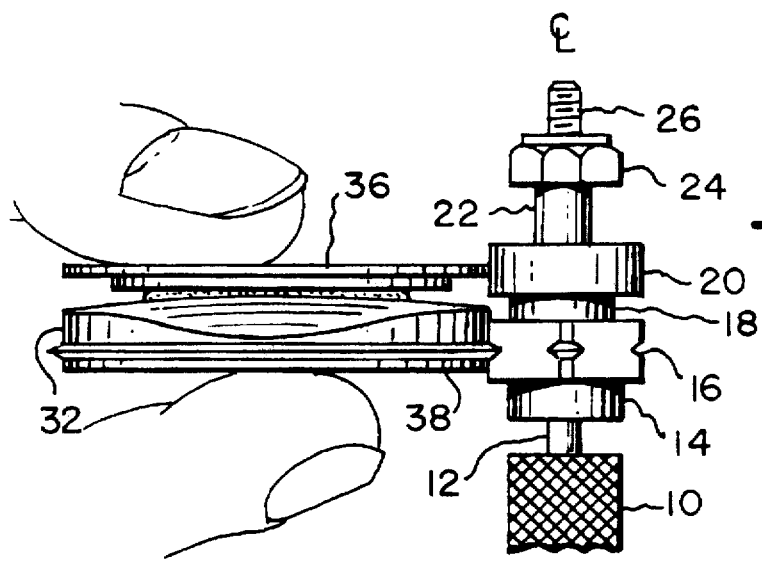
FIG. 2 is a partial side view of the rotary lens edger of FIG. 1 shown in engagement with a plastic lens to be edged.

As illustrated in FIGS. 1–4, a first embodiment of the rotary tool lens edge contouring device 5, according to the invention comprises a hand-held rotary tool 10 (which may be powered by a battery or by 110 V-DC) capable of producing a minimum of 15,000 RPM's. A suitable source of such rotary powered tools is commercially manufactured under the trademark "DREMEL". See, e.g. U.S. Pat. No. 2,255,541 to A. J. Dremel. Such rotary tools are well known, readily available and inexpensive to procure. As best seen in FIG. 2, the rotary tool 10 includes a spindle 12 to which are mounted in order, a spacer 14, cutter 16, spacer 18, guide roller 20, bushing 22 and, finally a self-locking nut 24 which is affixed to the threaded-end 26 of spindle 12.

Figure 4:
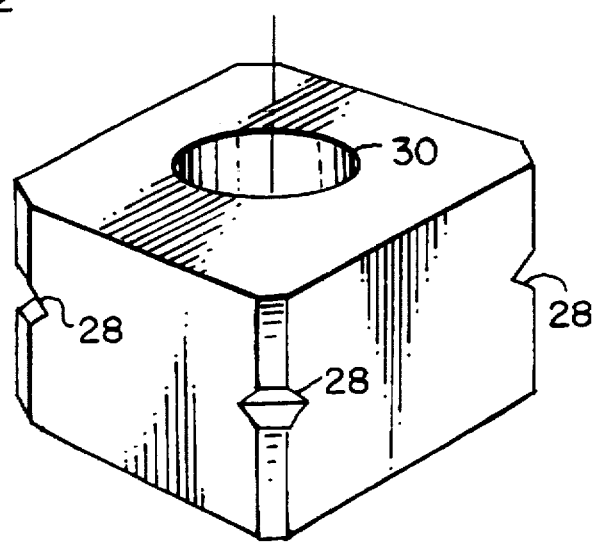
FIG. 4 is an enlarged perspective view of the square-shaped cutting tool utilized in the apparatus of the present invention.

As best seen in FIG. 4, cutter 16 is substantially square in shape and includes a generally V-shaped cutting notch 28 formed at each corner thereof and a centrally formed aperture 30 for mounting cutter 16 to spindle 26 of rotary tool 10. As is evident by FIG. 4, each corner of cutter 16 has also been slightly chamfered so as to form a cutting edge in association with V-shaped cutting notch 28.

Figure 3:
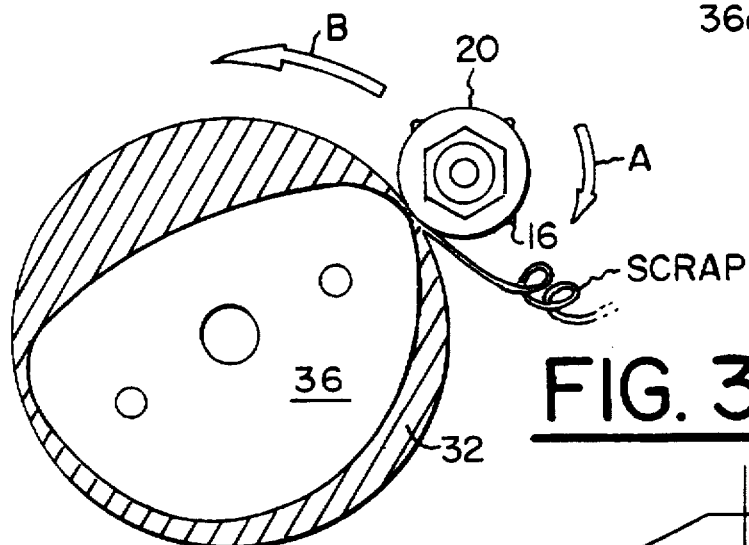
FIG. 3 is a top plan view of the edger shown in FIG. 2.

By referring to FIGS. 2 & 3, it will be seen that a lens blank 32 is affixed, such as by adhesive pad 34, to a lens pattern 36 which is shaped in the form of the desired finished lens. Thereafter, the combined lens blank 32/lens pattern 36 are presented to the aforementioned guide roller 20 and cutter 16 mounted on rotary tool 10 which may be hand held, or mounted to an appropriate fixture, not shown. As best illustrated in FIG. 3, the generally round lens blank 32 is presented by the operator holding the lens blank, to cutter 16, which is rotating in the direction indicated by arrow A. Upon contacting the rotating cutter 16, the operator manipulates (rotates) in direction B the lens blank 32 against cutter 16 until sufficient material (indicated by the shaded areas) has been removed from the lens blank's edge. As cutter 16 rotates, each of its chamfered edges removes a successive piece of the lens blank 16. It is believed that the removal process occurs by melting, due to the high coefficient of friction of the plastic lens material. This is especially true when the lenses to be machined are manufactured from acrylic plastic. At this point, guide roller 20 contacts the edge of lens pattern 36, and the final shaping of a specific lens which matches the shape of the pattern commences. Simultaneous to the final shape of the lens being cut, cutter 16 also is cutting a V-shaped bevel 38 (FIG. 2) which mimics the V-notches formed in cutter 16. It is also believed that the square shape of cutter 16 prevents scrap pieces machined from the lens from flying off the workpiece, as happens frequently when the cutter utilized is round in shape. Such scrap pieces had, in the past, created problems in the machining process.

At such a time that machining of the lens blank 32 has been completed, it is separated from lens pattern 36 by any conventional method. The shaped and edged lens is then cleaned, ready to be mounted in the specific frame for which it was intended.

Figure 2A:
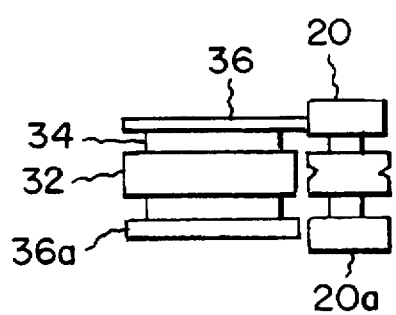
FIG. 2A is a diagrammatic illustration of the apparatus of FIG. 2 including a further lens pattern and guide roller.

It will be appreciated that although a single guide roller 20 has been illustrated, an additional guide roller 20a, and lens pattern 36a, as depicted diagrammatically in FIG. 2A, may be added to enhance the ease with which the edge of the lens blank 32 is cut. The additional guide roller 20a and lens pattern 36a would assist in stabilizing the lens blank 32 against the rotating cutter 16 and would, therefore, help the technician perform the cutting procedure. That is, positioning the pairs of similar lens patterns, 36 & 36a and guide rollers 20 and 20a above and below the lens blank 32 being shaped, the sandwiched assembly is prevented from rocking about the axis of the rotary tool to which it is being presented. The pair of lens patterns 20 and 20a is preferably aligned with each other on the lens blank 32 to ensure the blank is cut properly. A second, more sophisticated embodiment of the rotary tool lens edge contouring device 100 is fully illustrated in FIGS. 5–9. Herein, the rotary tool 10 (already completely described in the embodiment shown in FIGS. 1–4) is mounted to a portable box enclosure 110 by way of a jack-screw mechanism 112 such that it adjustable vertically, as indicated by arrow 114 in FIG. 6. Spindle 12 of tool 10 is positioned through an aperture 116 formed in top 118 of portable box enclosure 110. Threaded distal end 26 of spindle 12 is coupled to an annular guard/support member 120 by way of lock nut 24. Square-shaped V-notch cutter 16 and guide roller 20 are generally positioned above top 118, as best shown in FIG. 6.

Figure 5:
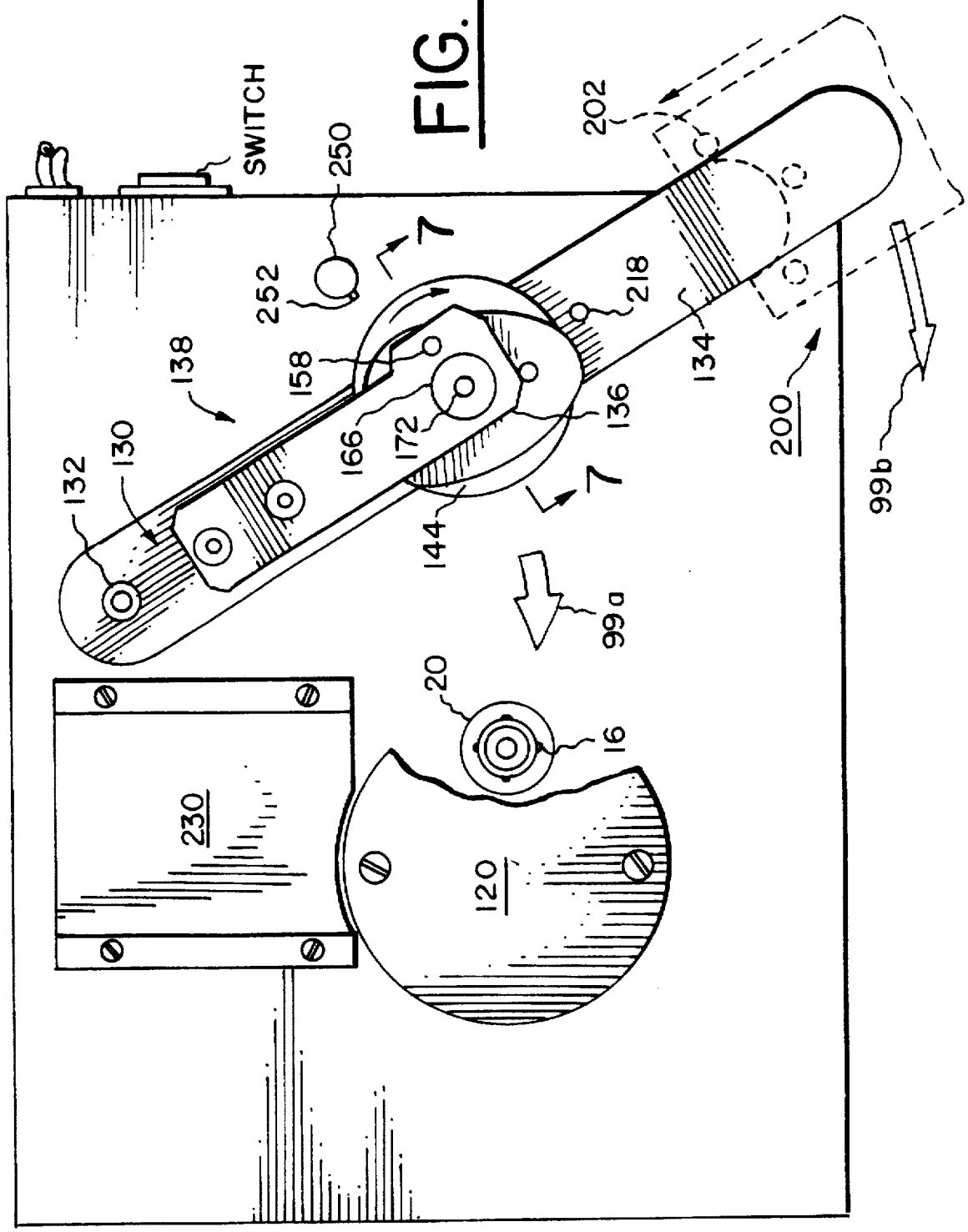
FIG. 5 is a plan view of a further embodiment of a lens edging apparatus embodying the present invention, wherein the rotary tool is mounted to a support fixture and the plastic eyewear lens to be edged is mounted to a member which is pivotally coupled to the support fixture so as to be rotated toward and away from the rotary cutting tool.
Figure 6:
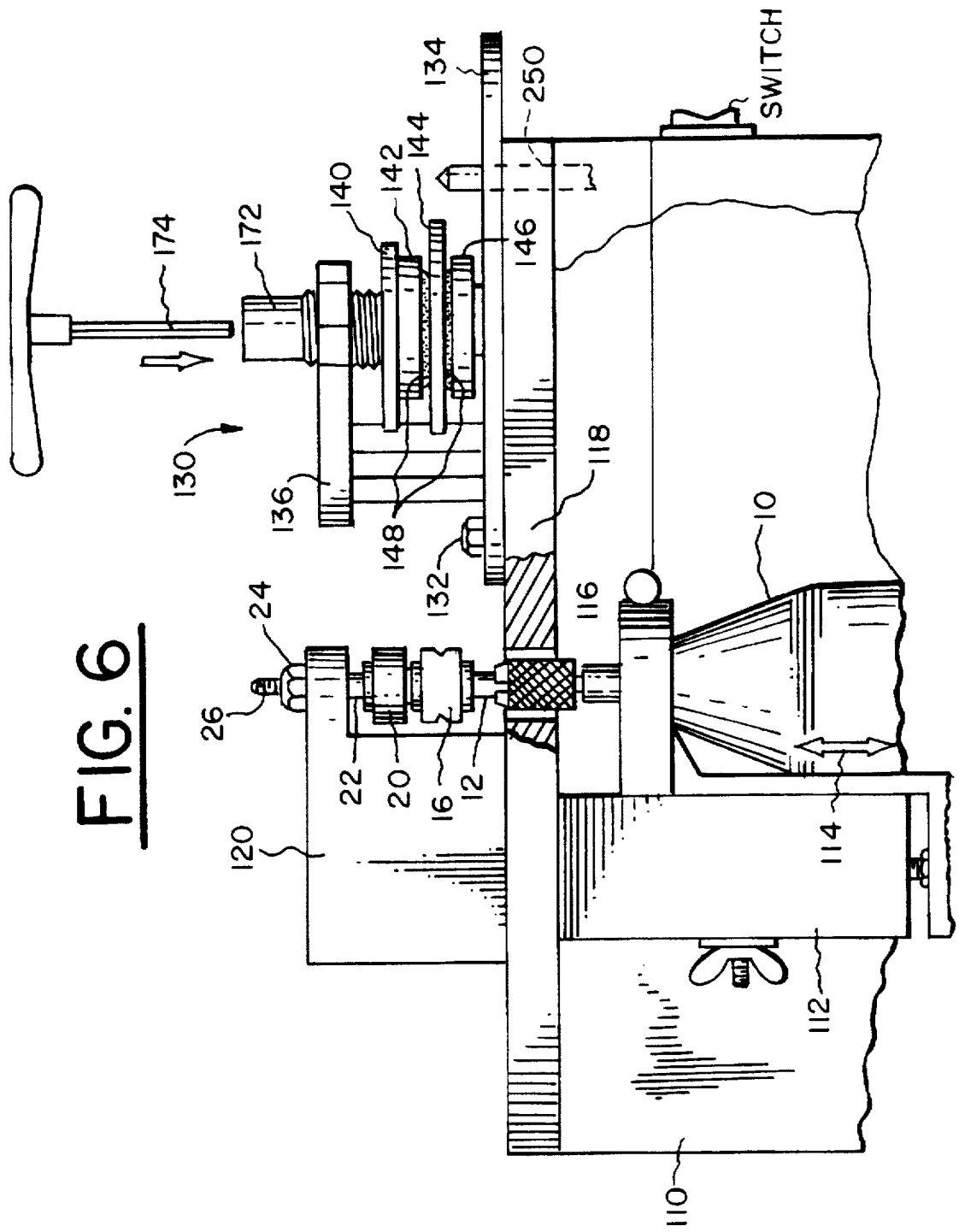
FIG. 6 is a partial front view of the apparatus illustrated in FIG. 5.
Figure 7:
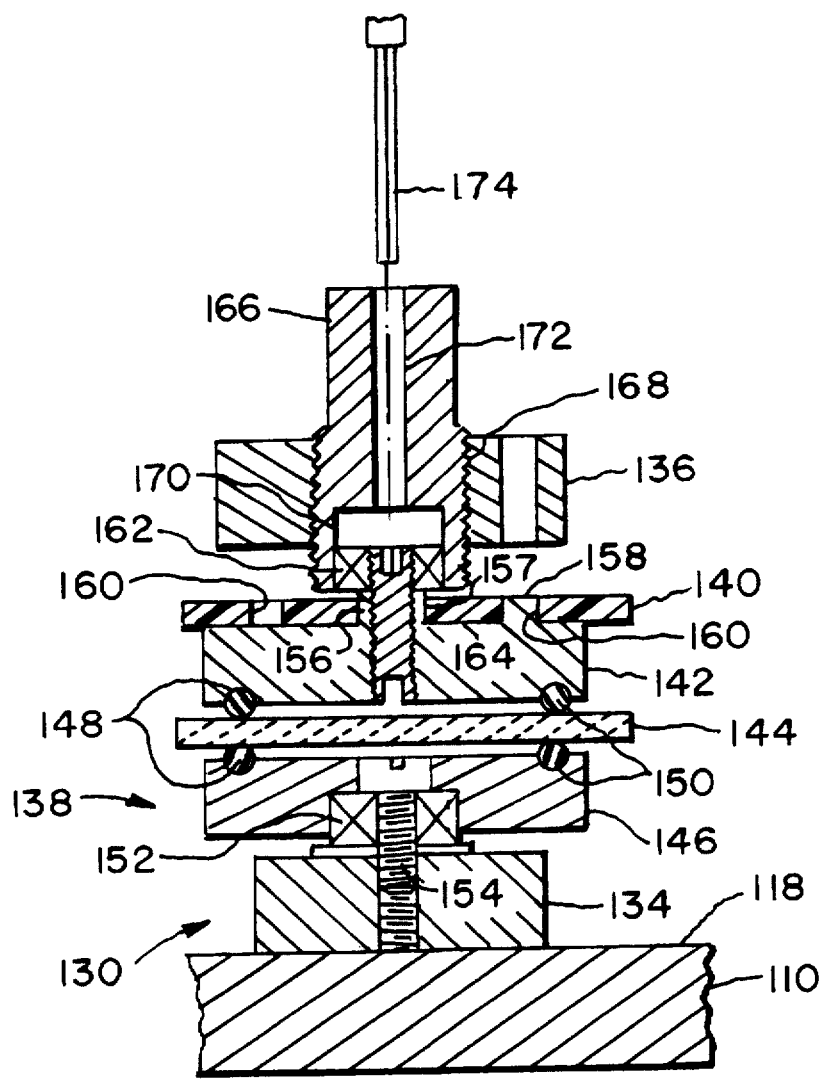
FIG. 7 is an enlarged sectional view taken along line 7—7 or FIG. 5.

A pivot arm mechanism 130 is mounted by means of a pivot pin device 132 to top 118 of box enclosure 110 so as to be rotatable toward and away from cutter 16 and guide roller 20 mounted to spindle 12 of rotary tool 10, as indicated by the arrows shown in FIG. 5. Pivot arm mechanism 130 includes an elongate pivot arm 134 which is coupled at one end thereof by way of previously described pivot pin device 132 to box enclosure top 118. A bar 136 is fixably mounted to member 134 so as cantilevered thereover. Referring to FIG. 7, it will be seen that a lens blank shaping assembly 138 is positioned between elongate pivot arm 134 and cantilever bar 136. Assembly 138 includes a lens pattern 140, an upper disc 142, a lens blank 144 to be edged and a lower disc 146. Lens blank 144 is sandwiched between the upper and lower discs 142, 146 respectively by way of resilient O-rings 148 which are fitted to channels 150 formed in each of the discs.

The lower disc 146 is mounted to a roller bearing 152 which is, in turn coupled to elongate pivot arm member 134 by screw 154. Upper disc 142 includes a centering boss 156 over which aperture 157 of lens pattern 140 is centered and a registration, or locating pin 158, which fits within and mates to one of two registration holes 160 formed in lens pattern 140. A roller bearing 162 is threadably coupled to upper disc 142 by way of Allen screw 164. A clamping bolt 166 is threaded through aperture 168 in bar 136 so as to capture roller bearing 162 in an appropriately sized aperture 170 formed therein. A further aperture 172 is formed through clamping bolt 166 to accommodate an Allen wrench 174 sized to be received by the head of Allen screw 164.

Figure 8:
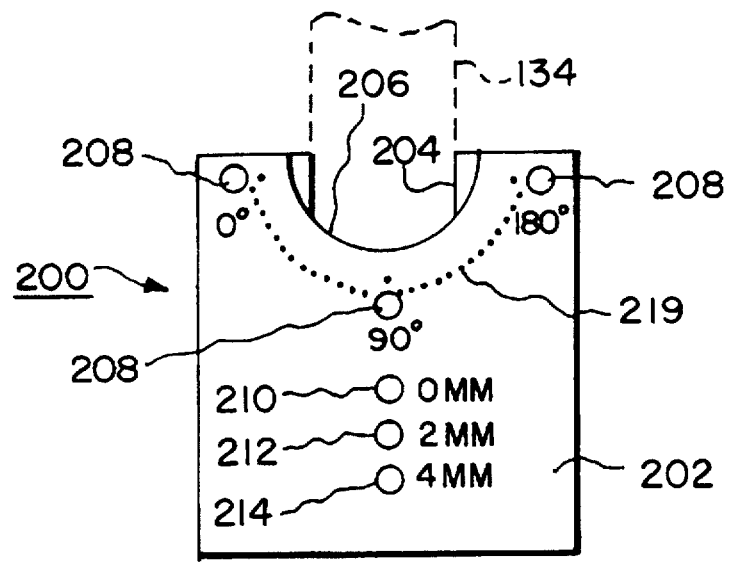
FIG. 8 is a top plan view of a gauge utilized in conjunction with the pivot arm shown in FIGS. 6 and 7 for aligning the lenses to be edged for proper IPD spacing and optical axis alignment.
Figure 9:
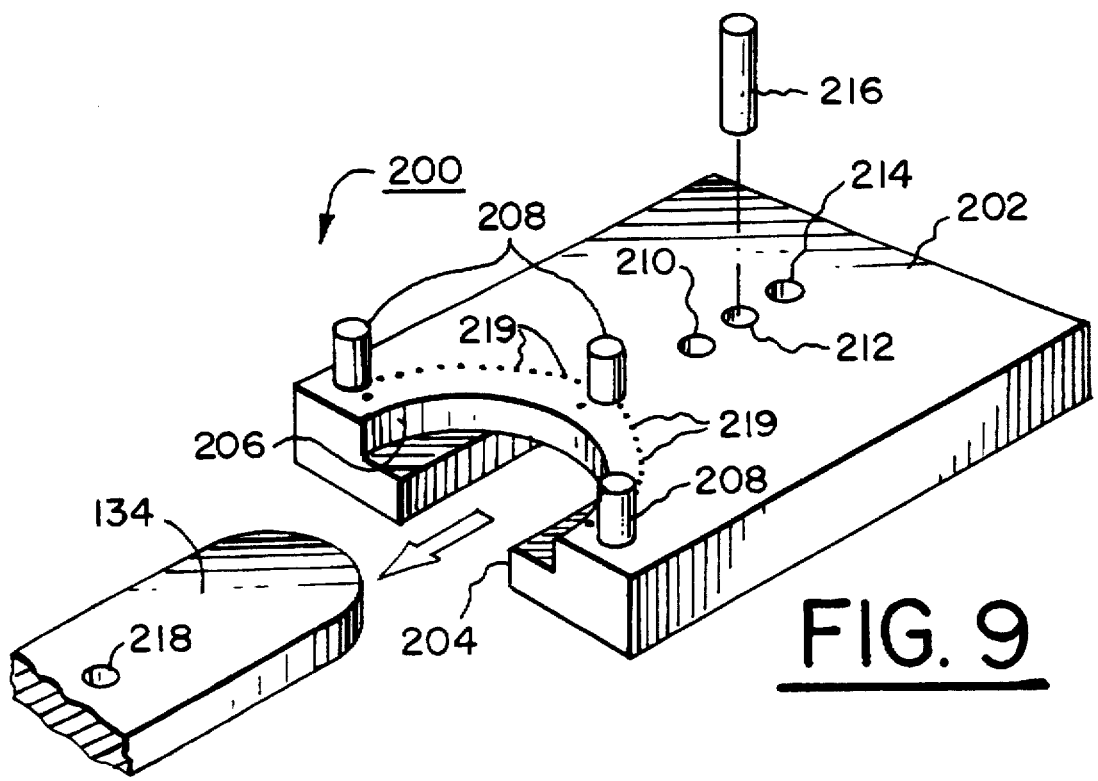
FIG. 9 is an exploded perspective view of such IPD gauges being introduced to the pivot arm.

An interpupillary distance (IPD) gauge assembly 200 (illustrated in FIGS. 8 and 9) comprises a slide member 202 which has a longitudinal slot 204 formed therein. The width of slot 204 is substantially the same as the width of elongate pivot arm 134, such that member 202 can be fitted thereto, as shown in dotted lines in FIG. 5. As illustrated, a hemispherically shaped aperture 206 is formed at one end of member 202. A series of three optical centering pins 208 are disposed about hemispherically shaped aperture at 0 degrees, 90 degrees and 180 degrees, as seen in FIG. 8. Pins 208 protrude upwardly and are spaced from each other to engage the edge of lens blank 144 when member 202 is slidably moved along arm 134. The pins 208 provide for the alignment of the optical axis of the lens being finished in the apparatus. A series of apertures 210, 212 and 214 are formed in slide member 202 longitudinally with the center, or 90 degree, protruding pin 208. A locating pin 216 (best seen in FIG. 9) is configured to be slidably received in any of the three apertures 210, 212 or 214, as well as a complimenting aperture 218 formed in pivot arm 134. Depending upon the IPD of the patient being fitted, the axis of the lens being prepared can be exactly centered or offset from the center of lens pattern 140 in stepped increments up to an offset of 4 mm. For example, if slide member 202 is positioned on pivot arm 134 such that the edge of lens blank 144 is positioned against the three locating pins 208 and locating pin 216 is fitted through aperture 210 into complimenting aperture 218 of pivot arm 134, lens blank 144 would be exactly centered. Should the patient require a greater IPD, the increase in distance can be achieved by simply registering lens blank 144 against optical centering pins 208 and then mating locating pin 216 to either aperture 212, which represents an offset of 2 millimeters, or to aperture 214, which represents an offset of 4 millimeters from optical center. The pens also align.

Further, all lens blanks are provided with an appropriate and well known marking on the face of the blank to indicate the axis of a cylinder of the lens. It is important that the cylinder axis of the patient be reproduced on the lens blank 144 being edged. This is achieved quite simply by matching the reference marks or indicia on the lens blank to the appropriate calibration mark 219 on slide member 202 (as displayed radially between the optical centering pins 208). Rotating lens blank 144 to align with the calibration mark on the slide member 202 thereby matches the axis of the cylinder of the lens with that required by the patient being fitted.

Upon setting the correct IPD measurement and aligning the cylinder axis, the lens blank 144 is firmly clamped between cantilever bar 136 and elongate pivot arm 134 by tightening clamping bolt 166 against centering boss 156. Thereafter, the previously referenced Allen wrench 174 is fitted through clamping bolt aperture 172 into Allen screw 164 which is threaded into upper disc 142. Lens blank 144 and lower disc 146, as well as upper disc 142 and lens pattern 140, are supported for rotation between roller bearing 152 and 162, and therefore, may be rotated by way of Allen wrench 174.

When all of the above procedures have been completed, rotary tool 10 would be energized by toggling a switch 220 to the "on" position. The pivot arm 134 would be grasped with one hand and the Allen wrench 174 with the other hand. Pivot arm 134 is rotated toward the rapidly rotating square shaped cutter 16 and roller bearing 20. When lens blank 144 is engaged against the rotating cutter 16, the operator would begin rotating Allen wrench 174 and, thus, the clamped lens assembly 138. The edge of lens blank 144 is thereby grossly skived away. As lens pattern 140 engages roller bearing 20, the final shape of the finished lens and the bevel are provided. Chips from the edging process may be collected in a scrap catcher 230 mounted to the box top 118 as shown in FIG. 5. The properly edged lens is removed, cleaned and then ready to be mounted in the patient's eyeglasses.

In some instances, it may be desirable to pre-shape the lens blank 144 before it is finally shaped. Accordingly, a heated, bulk-shaping knife 250 may be mounted to box enclosure 110 such that a cutting edge 252 thereof is adjacent lens blank 144, as seen in FIG. 5 & 6. Herein, the cutting edge 252 of knife 250 is heated by any appropriate method (for example, electrically) to a temperature sufficient to "melt" away the excess acrylic plastic material from lens blank 144 when pivot arm 134 is rotated toward knife 250 and lens pattern 144 rotated thereagainst. Thus, the greater portion of scrap material is quickly removed from the lens blank 144 which results in swift final shaping and edging of the lens.

The embodiments of the invention set forth herein should not be considered as limiting as they are given by way of illustration only. Therefore, many modifications may be brought thereto without departing from the basic principle of the invention.

It is claimed:

1. A portable, hand-held apparatus for contouring the edges of eyewear lenses, comprising:
   (a) a hand-held rotary power device having a spindle coupled thereto;
   (b) a guide roller mounted to said spindle for engaging and following the periphery of a lens pattern affixed to a lens blank to be edged contoured; and
   (c) cutter means having a rotatable cutter on said spindle and mounted to said rotary power device with and adjacent to said guide roller for engaging the edge of said lens blank while said pattern engages said guide roller for contouring the edge of said lens blank affixed to said lens pattern as said cutter means mounted to said rotary power device and guide roller is moved about said lens blank affixed to said pattern or said lens blank affixed to said pattern is revolved to present the edge of said blank and said pattern respectively to said cutter and guide roller.

2. The portable hand-held apparatus for contouring the edges of eyewear lenses as set forth in claim 1, wherein said cutter means comprises a cutter having four sides and edges, and upon each edge are defined cutting surfaces for engaging and contouring said lenses.

3. The apparatus as set forth in claim 2 wherein said cutter having four sides and edges with cutting surfaces defined thereon is substantially square shaped.

4. The apparatus as set forth in claim 3 wherein said cutting surfaces defined on said substantially square-shaped cutter include a further shape defining cutting surface for providing a further shape detail to the edge of said lens being contoured.

5. The apparatus of claim 4 wherein said further shape defining cutting surface is V-shaped.

6. The apparatus of claim 1, and including an additional guide roller mounted to said spindle and a complimentary lens pattern affixed to said lens blank to be edged, said additional guide roller and complimentary lens pattern stabilizing said lens blank when being contoured by said cutter means.

7. A portable apparatus for contouring the edges of eyewear lenses, comprising:
   (a) a rotary power tool having a spindle coupled thereto;
   (b) a guide roller mounted to said spindle for engaging and following the periphery of a lens pattern affixed to a lens blank to be contoured;
   (c) cutter means mounted to said rotary tool spindle adjacent said guide roller for engaging and contouring the edge of said lens blank affixed to said lens pattern;
   (d) a mounting fixture having means thereon for receiving and adjustably supporting said rotary power tool;
   (e) a lens holder mounted to said fixture, said lens holder being pivotable toward and away from said guide roller and cutter means mounted to said rotary tool spindle;
   (f) means coupled to said lens holder for rotatably mounting thereon a lens blank to be edge contoured such that said lens blank is aligned with said cutter means, and mounting to said lens holder a lens edge defining pattern coupled to and rotatable with said lens blank such that said pattern is aligned with said guide roller, whereby pivoting said lens holder toward said rotary tool introduces said lens blank to said cutter means for contouring thereof as said blank and pattern rotate.

8. The apparatus for contouring the edges of eyewear lenses as set forth in claim 7, wherein said lens holder comprises a first elongate arm pivotably coupled to said mounting fixture and a second arm mounted in cantilever fashion thereto, and said lens blank to be edge contoured and said lens edge defining pattern are rotatably mounted to and supported therebetween.

9. The apparatus for contouring the edges of eyewear lenses as set forth in claim 8, wherein upper and lower lens positioning discs are provided for locating and accurately positioning therebetween the lens blank to be edge contoured, and said discs include bearing means for coupling to said first and second arms.

10. The apparatus for contouring the edges of eyewear lenses as set forth in claim 9, wherein said lens edge defining pattern is coupled to said upper lens positioning disc.

11. The apparatus as set forth in claim 10, wherein said upper lens positioning disc includes means thereon for accurately registering thereto said lens edge defining pattern.

12. The apparatus as set forth in claim 11, wherein said means for registering on said upper lens positioning disc comprises a locating pin, and said pin being sized to fit within an complimentary aperture formed in said lens edge defining pattern.

13. The apparatus as set forth in claim 9, wherein said cantilever arm includes means adjustably coupled thereto for clamping said lens blank to be edge contoured between said upper and lower lens discs.

14. The apparatus as set forth in claim 13, wherein said clamping means comprises a first threaded member coupled to said bearing means on said upper disc.

15. The apparatus as set forth in claim 14, wherein said upper disc is coupled to said upper disc bearing means by way of a second threaded member.

16. The apparatus as set forth in claim 15, wherein said first threaded member includes an aperture axially formed therein for allowing access of a rotatable tool therethrough to said second threaded member whereby said lens edge pattern and said lens blank to be edged may be rotated by said tool.

17. The apparatus as set forth in claim 16, wherein said lower disc bearing means is coupled to said elongate arm by a threaded member.

18. The apparatus as set forth in claim 9 and further including a gauge assembly for slidable engagement with said elongate arm and movable therealong, said gauge assembly having first alignment means defined therein for positioning said lower disc with respect to said gauge assembly, and second alignment means for engagement against the edge of said lens blank being contoured for accurately positioning same for edge contouring by said cutter means mounted to said rotary tool.

19. The apparatus as set forth in claim 18 wherein said first alignment means comprises a hemispherically shaped aperture for engagement against the edge of said lower disc for registration thereof.

20. The apparatus as set forth in claim 19, said second alignment means comprises a plurality of vertical members radially disposed about said hemispherically shaped aperture, said members being arranged so as to engage and accurately position the edge of a lens blank to be edged when said gauge assembly is in place on said elongate arm.

21. The apparatus as set forth in claim 20, wherein said vertical members comprise three pins.

22. The apparatus as set forth in claim 21, wherein indicia is formed on said elongate arm between said vertical pins for adjustment of the lens blank.

23. The apparatus as set forth in claim 7 and further including a bulk lens shaping device coupled to said fixture for engagement with the edge of a lens to be contoured for quickly pre-shaping the lens edge prior to final edging thereof by said cutter means carried by said rotary tool.

24. The apparatus as set forth in claim 23, wherein said bulk lens shaping device for pre-shaping the lens edge comprises a heated cutting member mounted to said fixture in juxtaposition to said lens holder, such that a lens blank to be edged supported by said lens holder may be rotated thereagainst prior to final shaping to remove bulk portions thereof.

25. The apparatus as set forth in claim 18 wherein said lens is locatable at an interpupillary distance appropriate to the wearer of said eyewear lenses and said gauge assembly further includes a plurality of apertures formed therein, each of said apertures capable of being aligned with a complimentary aperture provided in said elongate arm and coupled thereto by a locating pin member such that the optical center of a lens to be edge contoured may be altered to adjust for the interpupillary distance of the lens being edge contoured.

26. The apparatus as set forth in claim 7 wherein said cutter skives chips outwardly from said blank as said cutter means rotates while said cutter means engages said blank, and further including a device mounted to said fixture outwardly from said cutter for collecting scrap machined from the lens blank being edge contoured, said chips which are skived from said edge of said eyewear lens.

* * * * *